(12) United States Patent
Lin

(10) Patent No.: US 11,897,712 B2
(45) Date of Patent: Feb. 13, 2024

(54) IMAGE FORMING DEVICE AND TRAY ASSEMBLY THEREOF

(71) Applicant: AVISION INC., Hsinchu (TW)

(72) Inventor: Chia-Ching Lin, Hsinchu (TW)

(73) Assignee: AVISION INC., Hsinchu (TW)

( * ) Notice: Subject to any disclaimer, the term of this patent is extended or adjusted under 35 U.S.C. 154(b) by 458 days.

(21) Appl. No.: 17/195,671

(22) Filed: Mar. 9, 2021

(65) Prior Publication Data
US 2021/0309469 A1    Oct. 7, 2021

(30) Foreign Application Priority Data

Apr. 1, 2020  (TW) ................................. 109111386

(51) Int. Cl.
| | | |
|---|---|---|
| *B65H 1/26* | (2006.01) | |
| *B65H 1/28* | (2006.01) | |
| *H04N 1/00* | (2006.01) | |

(52) U.S. Cl.
CPC ........... *B65H 1/28* (2013.01); *H04N 1/00615* (2013.01); *H04N 1/00625* (2013.01); *H04N 2201/0082* (2013.01)

(58) Field of Classification Search
CPC ... B65H 1/00; B65H 1/04; B65H 1/26; H04N 1/0615; H04N 1/00625; H04N 1/0051; H04N 1/04; B41J 29/13
See application file for complete search history.

(56) References Cited

U.S. PATENT DOCUMENTS

| | | | |
|---|---|---|---|
| 5,713,568 A | 2/1998 | Tamehira | |
| 6,848,685 B2 | 2/2005 | Katsuyama | |
| 9,254,972 B2 * | 2/2016 | Ukai | B65H 1/04 |
| 10,167,148 B2 * | 1/2019 | Kuno | G03G 21/1633 |
| 10,532,594 B2 * | 1/2020 | Akahane | B41J 2/1752 |
| 11,128,777 B2 * | 9/2021 | Sasaki | B65H 1/02 |
| 2005/0094227 A1 | 5/2005 | Hwang | |
| 2020/0406624 A1 * | 12/2020 | Miyasaka | B41J 2/1721 |

FOREIGN PATENT DOCUMENTS

| | | |
|---|---|---|
| CN | 101045377 B | 6/2010 |
| CN | 206938222 U | 1/2018 |
| WO | 2016/063708 A1 | 4/2016 |

* cited by examiner

*Primary Examiner* — Patrick H Mackey
(74) *Attorney, Agent, or Firm* — Winston Hsu

(57) ABSTRACT

An image forming device includes a case whereon a medium gateway opening is formed, and a tray assembly. The tray assembly includes a tray, a cover and a resilient component. The tray drives the cover to pivot relative to the case in a first pivoting direction from a second folding position to a second using position to reveal the medium gateway opening when the tray pivots relative to the case in the first pivoting direction from a first folding position to a first using position. When the tray pivots relative to the case in a second pivoting direction opposite to the first pivoting direction from the first using position to the first folding position, the cover is driven by the resilient component to pivot relative to the case in the second pivoting direction from the second using position to the second folding position to conceal the medium gateway opening.

8 Claims, 8 Drawing Sheets

IMAGE FORMING DEVICE AND TRAY ASSEMBLY THEREOF

BACKGROUND OF THE DISCLOSURE

1. Field of the Disclosure

The present invention relates to an image forming device and a tray assembly thereof, and more particularly to an image forming device which is capable of concealing a medium gateway opening, and a tray assembly thereof.

2. Description of the Prior Art

With development of automated equipment, image forming devices, such as scanners or printers, include medium gateway openings for allowing a medium, such as paper, to enter into or exit from the image forming devices for achieving automation of scanning or printing. However, the conventional medium gateway opening is usually with open design, and such configuration not only leads to wear, damage or malfunction of internal components caused by external substance entering into the image forming device easily via the open medium gateway opening but also causes a negative impact on aesthetic appearance.

SUMMARY OF THE DISCLOSURE

Therefore, it is an objective of the present invention to provide an image forming device which is capable of concealing a medium gateway opening, and a tray assembly thereof for solving the aforementioned problems.

In order to achieve the aforementioned objective, the present invention discloses an image forming device. The image forming device includes a casing and a tray assembly. The casing includes an upper side and a lateral side adjacent to the upper side. A medium gateway opening is formed on the lateral side. The tray assembly includes a tray body, a cover body and a resilient component. The tray body is pivoted to the casing and pivotally switchable relative to the casing between a first used position and a first folded position. The tray body covers the upper side of the casing when the tray body is pivoted to the first folded position. A side of the tray body is adjacent to the medium gateway opening when the tray body is pivoted to the first used position. The cover body is pivoted to the casing and pivotally switchable relative to the casing between a second used position and a second folded position. The cover body covers the lateral side of the casing to conceal the medium gateway opening when the cover body is pivoted to the second folded position. The cover body reveals the medium gateway opening when the cover body is pivoted to the second used position. The resilient component is connected to the cover body for biasing the cover body to pivot to the second folded position. The tray body pushes the cover body to drive the cover body to pivot relative to the casing from the second folded position to the second used position in a first pivoting direction when the tray body pivots relative to the casing from the first folded position to the first used position in the first pivoting direction, and the resilient component drives the cover body to pivot relative to the casing from the second used position to the second folded position in a second pivoting direction opposite to the first pivoting direction when the tray body pivots relative to the casing from the first used position to the first folded position in the second pivoting direction.

According to an embodiment of the present invention, a first guiding structure is formed on the cover body. At least one second guiding structure is formed on the tray body. The tray body drives the cover body to leave away from the second folded position by cooperation of the at least one second guiding structure and the first guiding structure during a period that the tray body pivots from the first folded position to the first used position.

According to an embodiment of the present invention, an accommodating space is formed on the tray body, and the cover body is partially accommodated inside the accommodating space when the tray body and the cover body are respectively located at the first folded position and the second folded position.

According to an embodiment of the present invention, the tray body includes at least one protruding structure, and the at least one protruding structure abuts against the cover body when the tray body pivots relative to the casing.

In order to achieve the aforementioned objective, the present invention discloses a tray assembly. The tray assembly includes a tray body, a cover body and a resilient component. The tray body is pivoted to a casing of an image forming device and pivotally switchable relative to the casing between a first used position and a first folded position. The tray body covers an upper side of the casing when the tray body is pivoted to the first folded position. A side of the tray body is adjacent to a medium gateway opening formed on a lateral side of the casing when the tray body is pivoted to the first used position. The cover body is pivoted to the casing and pivotally switchable relative to the casing between a second used position and a second folded position. The cover body covers the lateral side of the casing to conceal the medium gateway opening when the cover body is pivoted to the second folded position. The cover body reveals the medium gateway opening when the cover body is pivoted to the second used position. The resilient component is connected to the cover body for biasing the cover body to pivot to the second folded position. The tray body pushes the cover body to drive the cover body to pivot relative to the casing from the second folded position to the second used position in a first pivoting direction when the tray body pivots relative to the casing from the first folded position to the first used position in the first pivoting direction, and the resilient component drives the cover body to pivot relative to the casing from the second used position to the second folded position in a second pivoting direction opposite to the first pivoting direction when the tray body pivots relative to the casing from the first used position to the first folded position in the second pivoting direction.

According to an embodiment of the present invention, a first guiding structure is formed on the cover body. At least one second guiding structure is formed on the tray body. The tray body drives the cover body to leave away from the second folded position by cooperation of the at least one second guiding structure and the first guiding structure during a period that the tray body pivots from the first folded position to the first used position.

According to an embodiment of the present invention, an accommodating space is formed on the tray body, and the cover body is partially accommodated inside the accommodating space when the tray body and the cover body are respectively located at the first folded position and the second folded position.

According to an embodiment of the present invention, the tray body includes at least one protruding structure, and the at least one protruding structure abuts against the cover body when the tray body pivots relative to the casing.

In summary, in the present invention, when the tray body pivots relative to the casing from the first folded position to the first used position in the first pivoting direction, the tray body pushes the cover body to drive the cover body to pivot relative to the casing from the second folded position to the second used position in the first pivoting direction to reveal the medium gateway opening. When the tray body pivots relative to the casing from the first used position to the first folded position in the second pivoting direction, the resilient component drives the cover body to pivot relative to the casing from the second used position to the second folded position in the second pivoting direction to conceal the medium gateway opening. Therefore, the present invention can effectively prevent external substance from entering into the image forming device and improve aesthetic appearance.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct electrical/mechanical connection. Thus, if a first device is connected to a second device, that connection may be through a direct electrical/mechanical connection, or through an indirect electrical/mechanical connection via other devices and connections.

Figure 1:
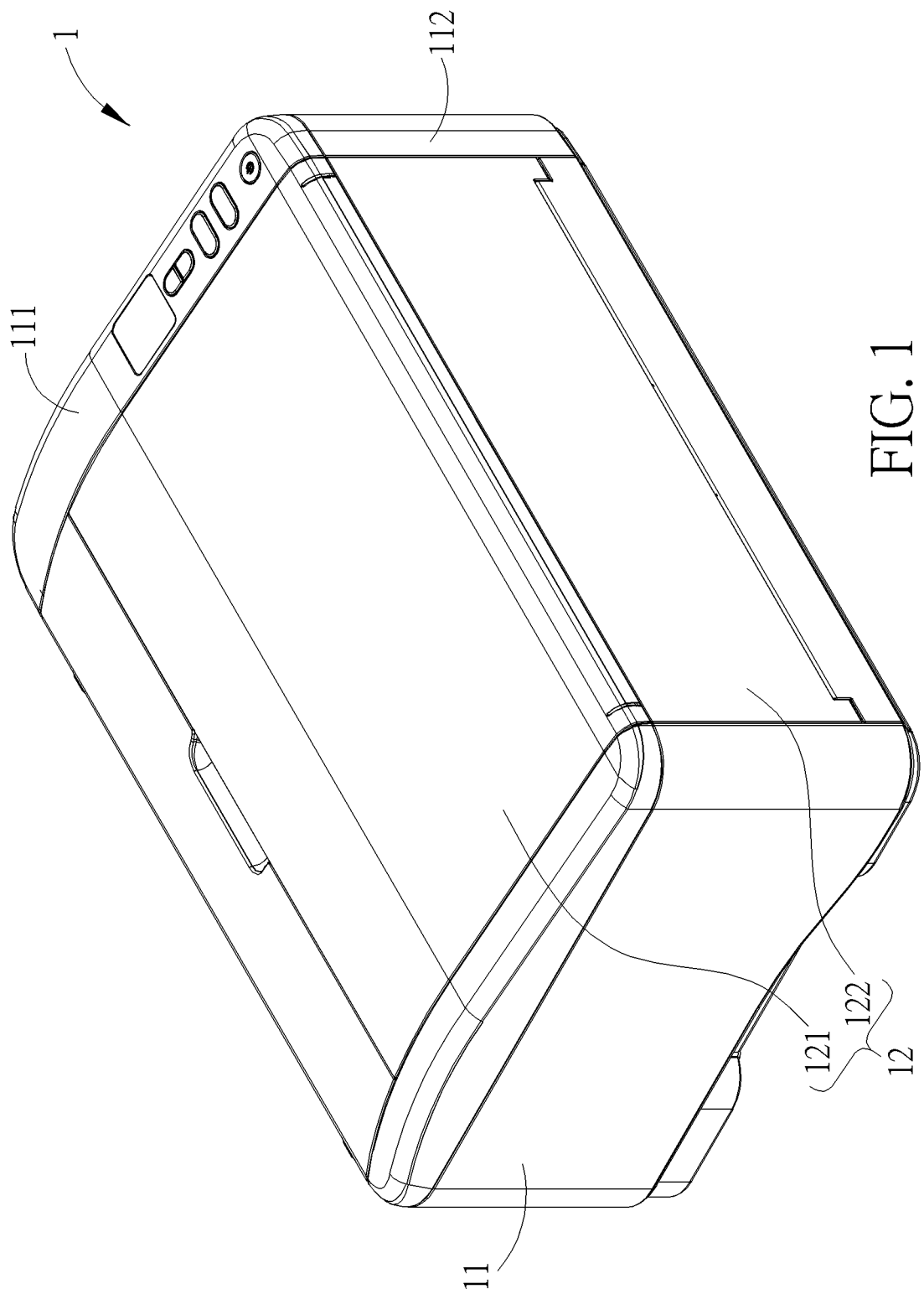
FIG. 1 and FIG. 2 are schematic diagrams of an image forming device in different states according to an embodiment of the present invention.
Figure 2:
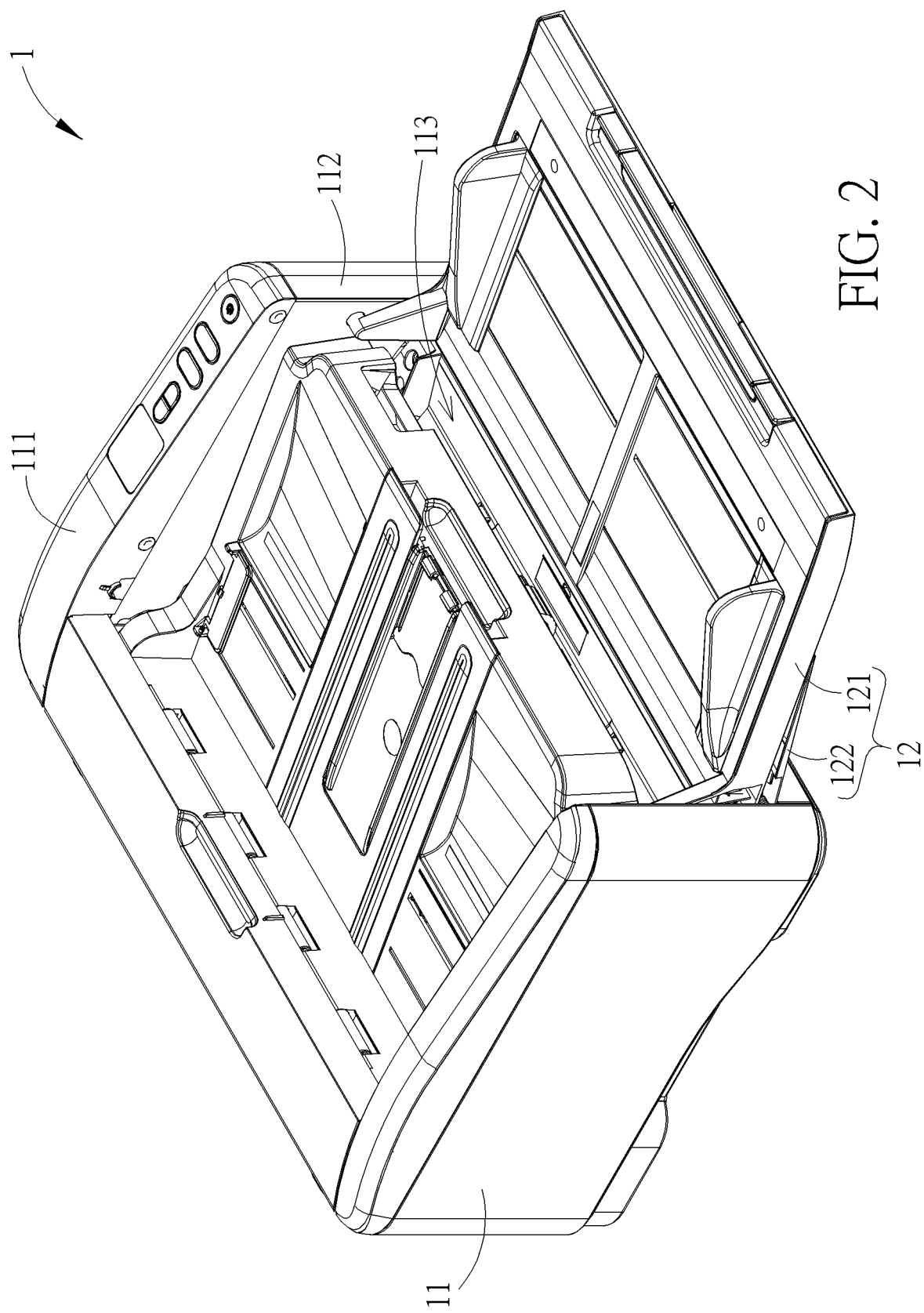
Figure 3:
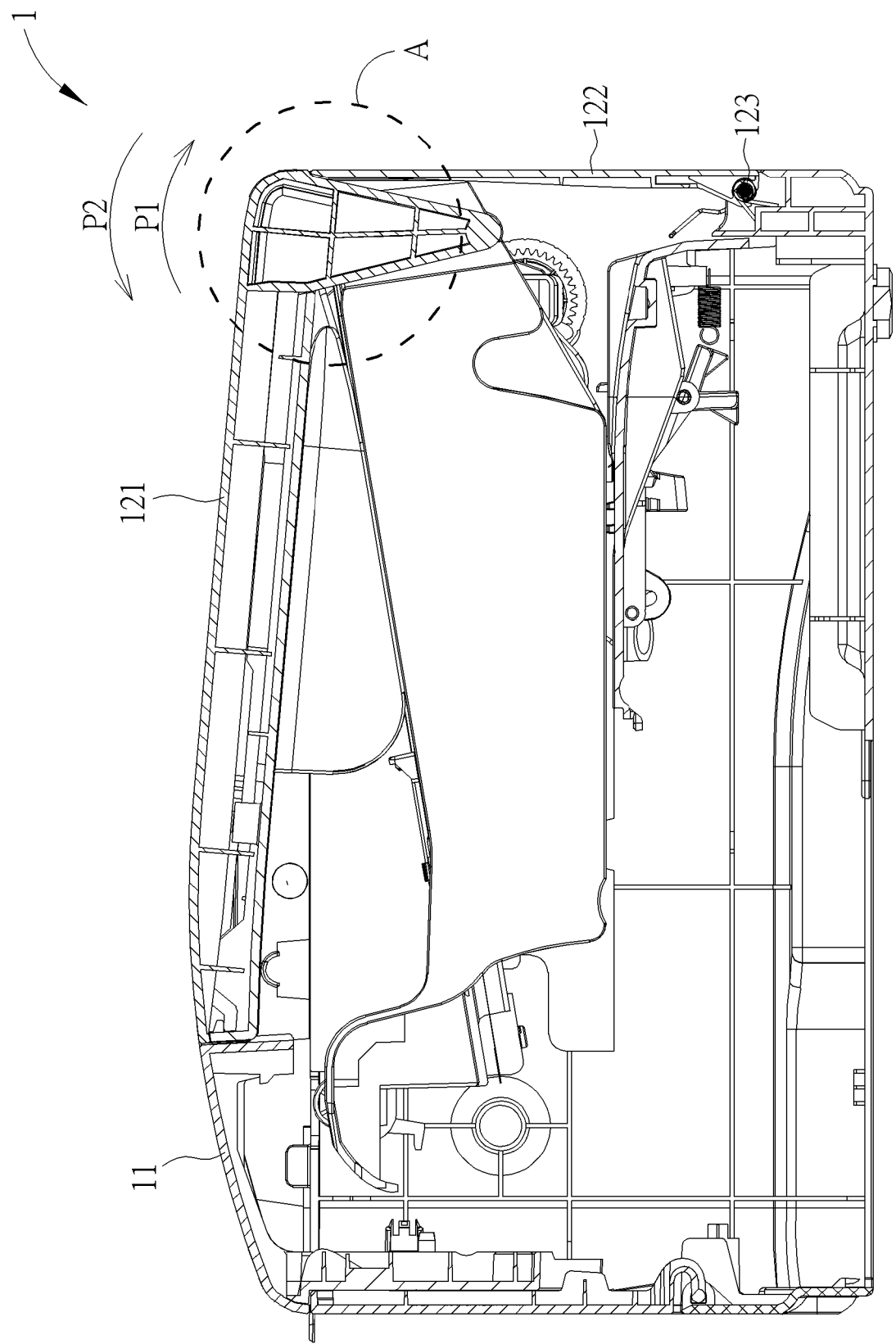
FIG. 3 and FIG. 4 are partial sectional diagrams of the image forming device in different states according to the embodiment of the present invention.
Figure 4:
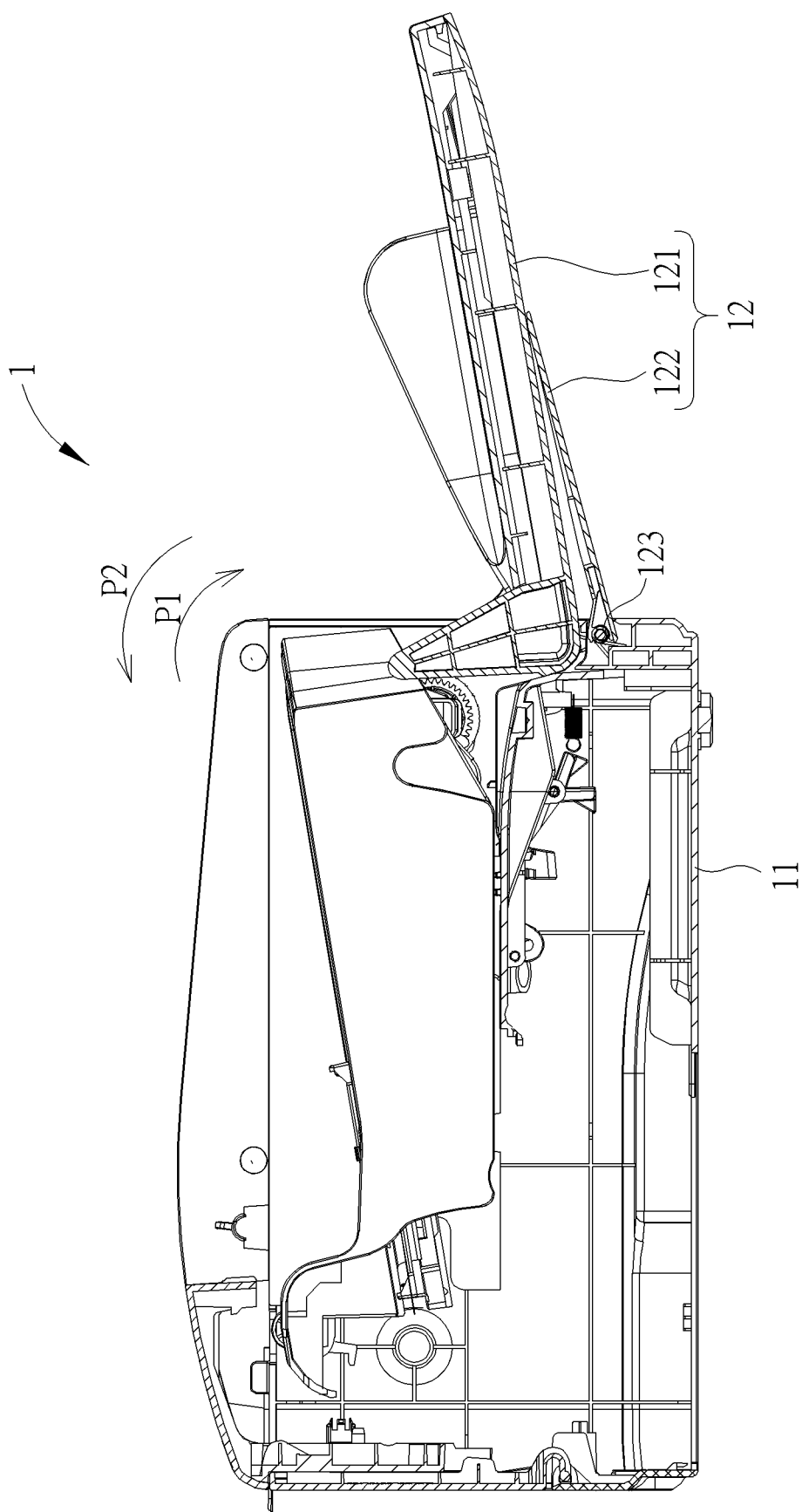
Figure 5:
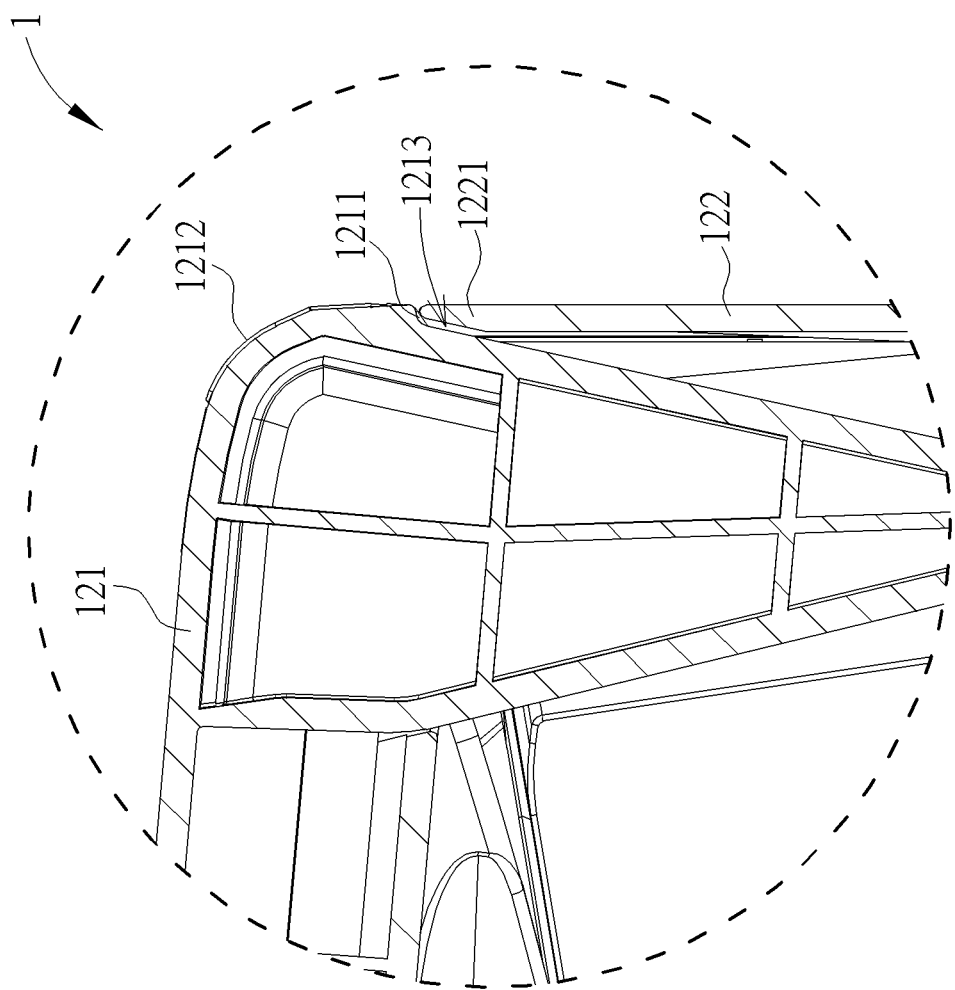
FIG. 5 is an enlarged diagram of an A portion of the image forming device shown in FIG. 3 according to the embodiment of the present invention.

Please refer to FIG. 1 to FIG. 5. FIG. 1 and FIG. 2 are schematic diagrams of an image forming device 1 in different states according to an embodiment of the present invention. FIG. 3 and FIG. 4 are partial sectional diagrams of the image forming device 1 in different states according to the embodiment of the present invention. FIG. 5 is an enlarged diagram of an A portion of the image forming device 1 shown in FIG. 3 according to the embodiment of the present invention. As shown in FIG. 1 to FIG. 5, the image forming device 1 includes a casing 11 and a tray assembly 12. The casing 11 includes an upper side 111 and a lateral side 112 adjacent to the upper side 111. A medium gateway opening 113 is formed on the lateral side 112. In this embodiment, the image forming device 1 can be a printer, and the medium gateway opening 113 can be an entrance for allowing a printing medium, such as paper, to enter into a medium gateway inside the printer. Furthermore, the tray assembly 12 can be an entrance tray assembly disposed adjacent to the entrance and for supporting the printing medium. However, the present invention is not limited to this embodiment. For example, in another embodiment, the medium gateway opening can be an exit of the printer for allowing the printing medium to exit from the medium gateway inside the printer, and the tray assembly can be an exit tray assembly of the printer disposed adjacent to the exit of the printer and for supporting the printing medium. Alternatively, in another embodiment, the image forming device also can be a scanner, and the medium gateway opening can be an entrance of the scanner for allowing a scanning medium to enter into a medium gateway inside the scanner or an exit of the scanner for allowing the scanning medium to exit from the medium gateway inside the scanner. Furthermore, the tray assembly can be an entrance tray assembly of the scanner disposed adjacent to the entrance of the scanner or an exit tray assembly of the scanner disposed adjacent to the exit of the scanner.

The tray assembly 12 includes a tray body 121, a cover body 122 and a resilient component 123. The tray body 121 is pivoted to the casing 11 and pivotally switchable relative to the casing 11 between a first used position as shown in FIG. 2 and FIG. 4 and a first folded position as shown in FIG. 1 and FIG. 3. The tray body 121 covers the upper side 111 of the casing 11 when the tray body 121 is pivoted to the first folded position. A side of the tray body 121 is adjacent to the medium gateway opening 113 when the tray body 121 is pivoted to the first used position for allowing the printing medium to enter the medium gateway via the medium gateway opening 113. The cover body 122 is pivoted to the casing 11 and pivotally switchable relative to the casing 11 between a second used position as shown in FIG. 2 and FIG. 4 and a second folded position as shown in FIG. 1 and FIG. 3. The cover body 122 covers the lateral side 112 of the casing 11 to conceal the medium gateway opening 113 when the cover body 122 is pivoted to the second folded position. The cover body 122 reveals the medium gateway opening 113 when the cover body 122 is pivoted to the second used position. The resilient component 123 is connected to the cover body 122 for biasing the cover body 122 to pivot to the second folded position. In this embodiment, preferably, the resilient component 123 can be a torsional spring connected to the cover body 122 and the casing 11. However, the present invention is not limited to this embodiment. For example, in another embodiment, the resilient component also can be an extension spring or a leaf spring connected to the cover body and another structure.

The tray body 121 pushes the cover body 122 to drive the cover body 122 to pivot relative to the casing 11 from the second folded position as shown in FIG. 3 to the second used position as shown in FIG. 4 in a first pivoting direction P1 when the tray body 121 pivots relative to the casing 11 from the first folded position as shown in FIG. 3 to the first used position as shown in FIG. 4 in the first pivoting direction P1. At this moment, the cover body 122 reveals the medium gateway opening 113, and the resilient component 123 is forced to be resiliently deformed. A resilient recovering force provided by the resilient component 123 drives the cover body 122 to pivot relative to the casing 11 from the second used position as shown in FIG. 4 to the second folded position as shown in FIG. 3 in a second pivoting direction P2 opposite to the first pivoting direction P1 when the tray body 121 pivots relative to the casing 11 from the first used position as shown in FIG. 4 to the first folded position as shown in FIG. 3 in the second pivoting direction P2. At this moment, the cover body 122 covers the lateral side 112 of the casing 11 to conceal the medium gateway opening 113.

Figure 6:
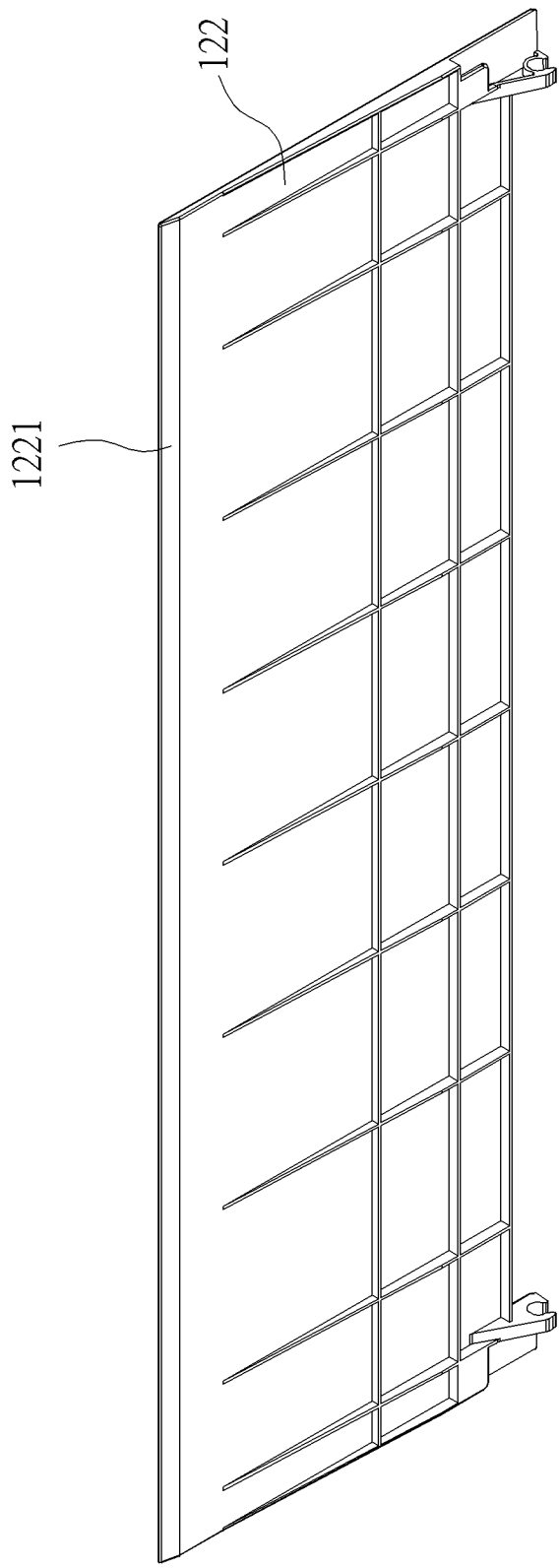
FIG. 6 is a diagram of a cover body according to the embodiment of the present invention.
Figure 7:
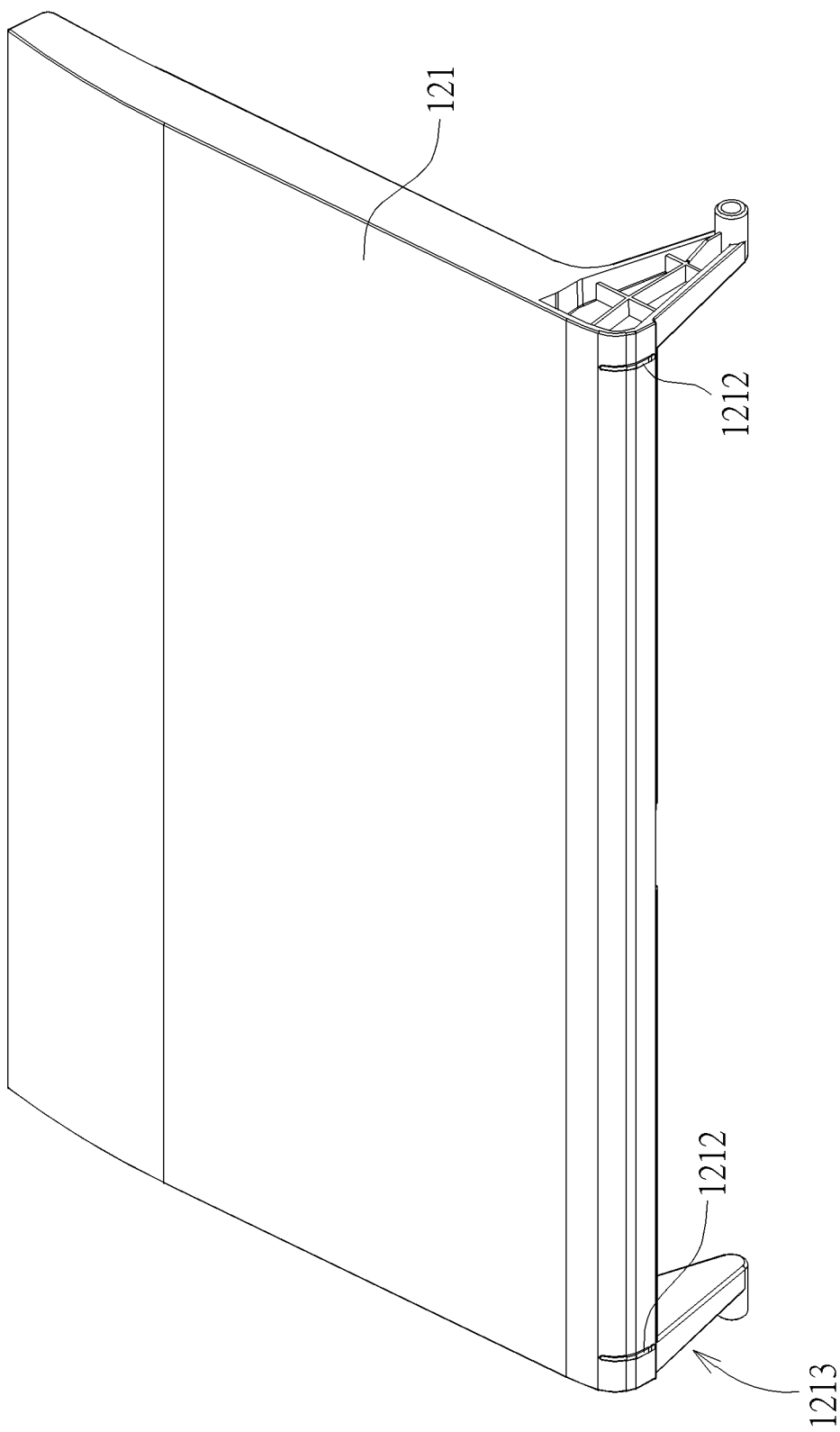
FIG. 7 and FIG. 8 are partial diagrams of a tray body at different views according to the embodiment of the present invention.
Figure 8:
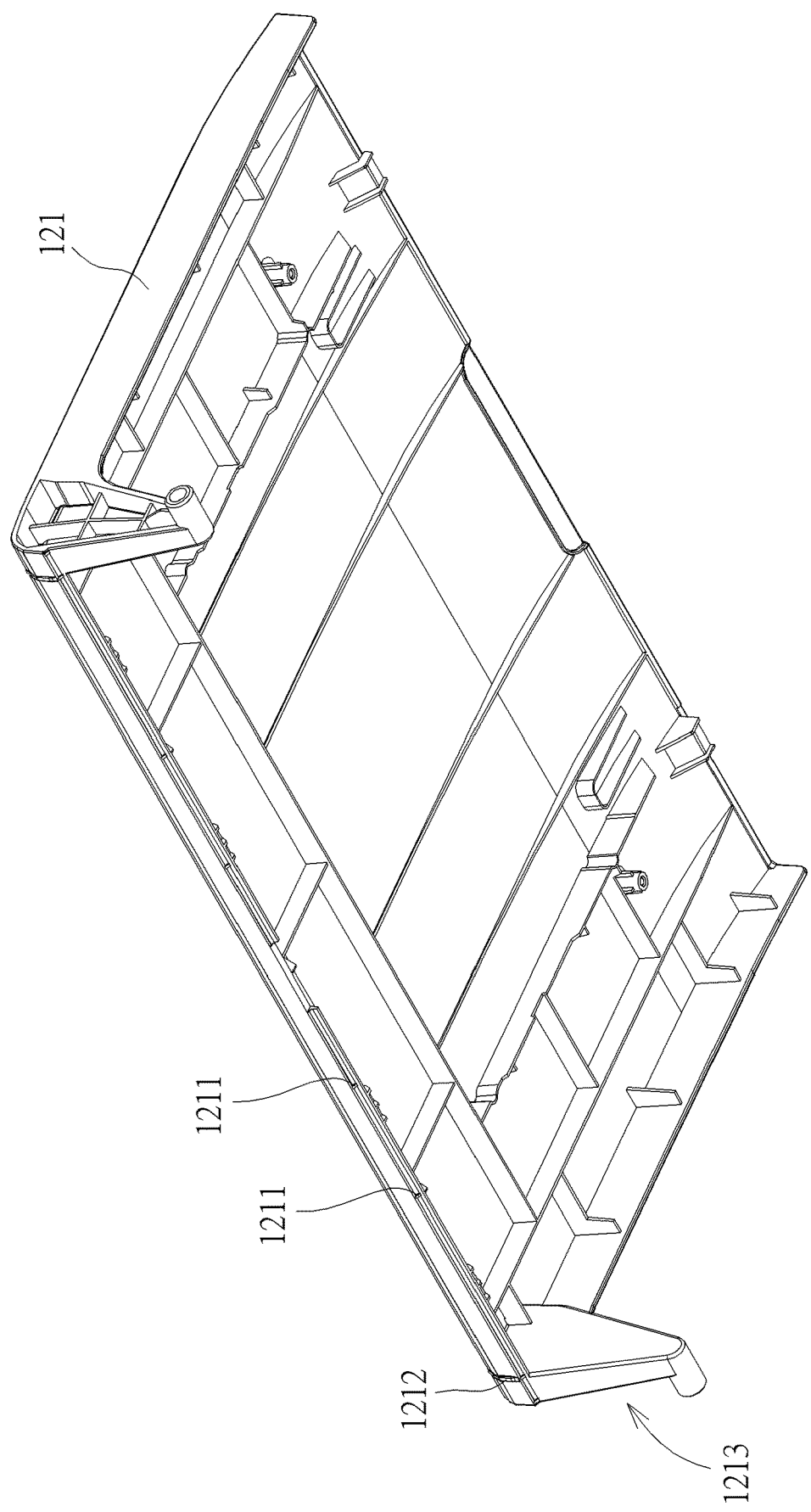

Please refer to FIG. 6 to FIG. 8. FIG. 6 is a diagram of the cover body 122 according to the embodiment of the present invention. FIG. 7 and FIG. 8 are partial diagrams of the tray body 121 at different views according to the embodiment of the present invention. As shown in FIG. 6 to FIG. 8, in order to drive the cover body 122 to pivot by the tray body 121 more smoothly, specifically, in this embodiment, a first guiding structure 1221 is formed on the cover body 122, and a plurality of second guiding structures 1211 are formed on the tray body 121. The tray body 121 drives the cover body 122 to leave away from the second folded position by cooperation of the plurality of second guiding structures 1211 and the first guiding structure 1221 during a period that the tray body 121 pivots from the first folded position to the first used position. Furthermore, in this embodiment, preferably, each second guiding structure 1211 can be a slanted rib, and the first guiding structure 1221 can be a slanted surface structure with an arc edge chamfer. However, the present invention is not limited to this embodiment.

Furthermore, the tray body 121 includes two protruding structures 1212. The two protruding structures 1212 abut against the cover body 122 when the tray body 121 pivots relative to the casing 11 for preventing a direct contact of an entire side of the tray body 121 and the cover body 122 to reduce a contact area of the tray body 121 and the cover body 122, which not only can prevent damage of the tray body 121 worn by the cover body 122 but also can prevent an excessive friction between the tray body 121 and the cover body 122 which may resist pivotal movement of the cover body 122 driven by the tray body 121.

Besides, in order to ensure the cover body 122 to cover the lateral side 112 of the casing 11 closely, an accommodating space 1213 is formed on the tray body 121. The cover body 122 is partially accommodated inside the accommodating space 1213 when the tray body 121 and the cover body 122 are respectively located at the first folded position and the second folded position.

However, the structures, the numbers and the shapes of the tray body and the cover body are not limited to this embodiment. It depends on practical demands. For example, in another embodiment, the tray body also can include one first guiding structure, one second guiding structure and one protruding structure only. Furthermore, the first guiding structure can be a slanted surface structure with an arc edge chamfer, and the second guiding structure can be an arc surface structure accordingly. Alternatively, in another embodiment, the first guiding structure, the second guiding structure, the protruding structure or the accommodating can be omitted selectively as long as it does not interfere with the pivotal movement of the cover body relative to the casing.

As shown in FIG. 1 to FIG. 8, when it is desired to use the image forming device 1, the tray body 121 can be operated to pivot relative to the casing 11 from the first folded position as shown in FIG. 3 to the first used position as shown in FIG. 4 in the first pivoting direction P1. When the tray body 121 pivots relative to the casing 11 in the first pivoting direction P1 to leave away from the first folded position as shown in FIG. 3, the tray body 121 can drive the cover body 122 by the cooperation of the plurality of second guiding structures 1211 and the first guiding structure 1221 to pivotally leave away from the second folded position. During a period that the tray body 121 drives the cover body 122 to pivot from the second folded position as shown in FIG. 3 to the second used position as shown in FIG. 4 in the first pivoting direction P1, cooperation of the two protruding structures 1212 and the cover body 122 not only can prevent wear damage of the tray body 121 caused by the direct contact of the tray body 121 and the cover body 122 but also can reduce the friction between the tray body 121 and the cover body 122 to ensure a smooth pivotal movement of the cover body 122 toward the second used position driven by the tray body 121. When the tray body 121 and the cover body 1222 pivot relative to the casing 11 to the first used position and the second used position as shown in FIG. 4 respectively, the side of the tray body 121 is adjacent to the medium gateway opening 113, and the medium gateway opening 113 is revealed. At this moment, the printing medium can enter into the image forming device 1 via the tray body 121 and the medium gateway opening 113. Furthermore, when the tray body 121 and the cover body 122 pivot relative to the casing 11 to the first used position and the second used position as shown in FIG. 4 respectively, the resilient component 123 is forced to be resiliently deformed.

On the other hand, when it is not required to use the image forming device 1 anymore, the tray body 121 can be operated to pivot relative to the casing 11 from the first used position as shown in FIG. 4 to the first folded position as shown in FIG. 3 in the second pivoting direction P2. When the tray body 121 pivots relative to the casing 11 from the first used position as shown in FIG. 4 to the first folded position as shown in FIG. 3 in the second pivoting direction P2, the resilient recovering force provided by the resilient component 123 can drive the cover body 122 to pivot relative to the casing 11 from the second used position as shown in FIG. 4 to the second folded position as shown in FIG. 3 in the second pivoting direction P2 and to be partially accommodated inside the accommodating space 1213 for covering the lateral side 112 of the casing 11 closely and concealing the medium gateway opening 113. Besides, during the aforementioned process, the cooperation of the two protruding structures 1212 and the cover body 122 also can prevent wear damage of the tray body 121 caused by the direct contact of the tray body 121 and the cover body 122 and reduce the friction between the tray body 121 and the cover body 122 to ensure a smooth pivotal movement of the cover body 122 toward the second folded position driven by the resilient component 123.

In contrast to the prior art, in the present invention, when the tray body pivots relative to the casing from the first folded position to the first used position in the first pivoting direction, the tray body pushes the cover body to drive the cover body to pivot relative to the casing from the second folded position to the second used position in the first pivoting direction to reveal the medium gateway opening. When the tray body pivots relative to the casing from the first used position to the first folded position in the second pivoting direction, the resilient component drives the cover body to pivot relative to the casing from the second used position to the second folded position in the second pivoting direction to conceal the medium gateway opening. Therefore, the present invention can effectively prevent external substance from entering into the image forming device and improve aesthetic appearance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An image forming device comprising:
   a casing comprising an upper side and a lateral side adjacent to the upper side, a medium gateway opening being formed on the lateral side; and
   a tray assembly comprising:
      a tray body pivoted to the casing and pivotally switchable relative to the casing between a first used position and a first folded position, the tray body covering the upper side of the casing when the tray body is pivoted to the first folded position, a side of the tray body being adjacent to the medium gateway opening when the tray body is pivoted to the first used position;
      a cover body pivoted to the casing and pivotally switchable relative to the casing between a second used position and a second folded position, the cover body covering the lateral side of the casing to conceal the medium gateway opening when the cover body is pivoted to the second folded position, the cover body revealing the medium gateway opening when the cover body is pivoted to the second used position; and
      a resilient component connected to the cover body for biasing the cover body to pivot to the second folded position;
      wherein the tray body pushes the cover body to drive the cover body to pivot relative to the casing from the second folded position to the second used position in a first pivoting direction when the tray body pivots relative to the casing from the first folded position to the first used position in the first pivoting direction, and the resilient component drives the cover body to pivot relative to the casing from the second used position to the second folded position in a second pivoting direction opposite to the first pivoting direction when the tray body pivots relative to the casing from the first used position to the first folded position in the second pivoting direction;
      wherein a first guiding structure is formed on the cover body, at least one second guiding structure is formed on the tray body, the tray body drives the cover body to leave away from the second folded position by cooperation of the at least one second guiding structure and the first guiding structure during a period that the tray body pivots from the first folded position to the first used position;
      wherein the at least one second guiding structure is a slanted rib, and the first guiding structure is a slanted surface structure with an arc edge chamfer.

2. The image forming device of claim 1, wherein an accommodating space is formed on the tray body, and the cover body is partially accommodated inside the accommodating space when the tray body and the cover body are respectively located at the first folded position and the second folded position.

3. The image forming device of claim 2, wherein the tray body comprises at least one protruding structure, and the at least one protruding structure abuts against the cover body when the tray body pivots relative to the casing.

4. The image forming device of claim 1, wherein the tray body comprises at least one protruding structure, and the at least one protruding structure abuts against the cover body when the tray body pivots relative to the casing.

5. A tray assembly comprising:
   a tray body pivoted to a casing of an image forming device and pivotally switchable relative to the casing between a first used position and a first folded position, the tray body covering an upper side of the casing when the tray body is pivoted to the first folded position, a side of the tray body being adjacent to a medium gateway opening formed on a lateral side of the casing when the tray body is pivoted to the first used position;
   a cover body pivoted to the casing and pivotally switchable relative to the casing between a second used position and a second folded position, the cover body covering the lateral side of the casing to conceal the medium gateway opening when the cover body is pivoted to the second folded position, the cover body revealing the medium gateway opening when the cover body is pivoted to the second used position; and
   a resilient component connected to the cover body for biasing the cover body to pivot to the second folded position;
   wherein the tray body pushes the cover body to drive the cover body to pivot relative to the casing from the second folded position to the second used position in a first pivoting direction when the tray body pivots relative to the casing from the first folded position to the first used position in the first pivoting direction, and the resilient component drives the cover body to pivot relative to the casing from the second used position to the second folded position in a second pivoting direction opposite to the first pivoting direction when the tray body pivots relative to the casing from the first used position to the first folded position in the second pivoting direction;
   wherein a first guiding structure is formed on the cover body, at least one second guiding structure is formed on the tray body, the tray body drives the cover body to leave away from the second folded position by cooperation of the at least one second guiding structure and the first guiding structure during a period that the tray body pivots from the first folded position to the first used position;
   wherein the at least one second guiding structure is a slanted rib, and the first guiding structure is a slanted surface structure with an arc edge chamfer.

6. The tray assembly of claim 5, wherein an accommodating space is formed on the tray body, and the cover body is partially accommodated inside the accommodating space when the tray body and the cover body are respectively located at the first folded position and the second folded position.

7. The tray assembly of claim 6, wherein the tray body comprises at least one protruding structure, and the at least one protruding structure abuts against the cover body when the tray body pivots relative to the casing.

8. The tray assembly of claim 5, wherein the tray body comprises at least one protruding structure, and the at least one protruding structure abuts against the cover body when the tray body pivots relative to the casing.

* * * * *